United States Patent [19]

Natarajan et al.

[11] Patent Number: 5,608,721

[45] Date of Patent: Mar. 4, 1997

[54] COMMUNICATIONS NETWORK AND METHOD WHICH IMPLEMENT DIVERSIFIED ROUTING

[75] Inventors: Kadathur S. Natarajan, Mesa, Ariz.; Katta G. Murty, Ann Arbor, Mich.

[73] Assignee: Motorola, Inc., Schaumburg, Ill.

[21] Appl. No.: 415,800

[22] Filed: Apr. 3, 1995

[51] Int. Cl.$^6$ ..................................... H04Q 11/04
[52] U.S. Cl. ........................ 370/238; 370/351; 455/13.1
[58] Field of Search .................................. 370/16, 17, 54, 370/58.2, 60, 94.1, 95.1, 95.3, 110.1; 455/12.1, 13.1; 379/113, 133, 134, 139, 220, 221

[56] References Cited

U.S. PATENT DOCUMENTS

| | | | |
|---|---|---|---|
| 4,905,233 | 2/1990 | Cain et al. | 370/94.1 |
| 5,249,181 | 9/1993 | Wang et al. | 370/60 |
| 5,253,161 | 10/1993 | Nemirovsky et al. | 364/402 |
| 5,253,248 | 10/1993 | Dravida et al. | 370/16 |
| 5,365,520 | 11/1994 | Wang et al. | 370/60 |
| 5,430,729 | 7/1995 | Rahnema | 370/94.1 |
| 5,455,865 | 10/1995 | Perlman | 380/49 |
| 5,467,345 | 11/1995 | Cutler, Jr. et al. | 370/60 |

*Primary Examiner*—Douglas W. Olms
*Assistant Examiner*—Russell Blum
*Attorney, Agent, or Firm*—Harold C. McGurk, IV

[57] ABSTRACT

A communications network (20) includes any number of moving switching nodes (30) and a route-determining node (28). The route-determining node (28) performs an off-line procedure (58) to define a-priori routing for the entire network. This procedure (58) is performed repetitively to track switching node (30) movement and to define routing for numerous epochs included in a planning period. The procedure (58) includes a process (86) for determining all shortest path routes between all possible origination and destination switching nodes (30). Another process (84) matches predicted call traffic for a subject epoch with the shortest path routes. Another process (88) generates routing code tables (54) in response to the predicted call traffic matched to shortest path routes. This process (88) assigns logical routing IDs (52) to physically distinct, shortest path routes in proportion to the predicted call traffic allocated to the distinct routes.

18 Claims, 9 Drawing Sheets

DESTINATION NODES

| LINK CAPACITY TABLE ||
|---|---|
| LINK ID | CAPACITY |
| 31-32 | |
| 31-34 | |
| 32-33 | |
| 32-35 | |
| 33-36 | |
| 34-35 | |
| 34-37 | |
| 35-36 | |
| 35-38 | |
| 36-39 | |
| 37-38 | |
| 38-39 | |

COMMUNICATIONS NETWORK AND METHOD WHICH IMPLEMENT DIVERSIFIED ROUTING

FIELD OF THE INVENTION

The present invention relates generally to communication networks. More specifically, the present invention relates to the routing of communications through a multiplicity of communication links.

BACKGROUND OF THE INVENTION

Communication networks, such as those used to deliver telecommunications, to interconnect computers, and the like, may include any number of nodes interconnected by communication links. The networks may deliver electronic communications between two points by routing the communications over the links from node to node within the network. As the number of nodes in a network increases and as the number of communication paths available to each network node increases, the number of potential paths available for delivering any single communication likewise increases.

Accordingly, networks use techniques for specifying a route to follow when delivering a communication from an origination node to a destination node. Usually, the shortest possible path between two network nodes is a desirable route, and conventional networks implement techniques to identify shortest path routes and to cause information to flow along the shortest path routes.

However, as network size increases, several shortest physical path routes are possible between various origination and destination nodes. Conventional networks which route traffic along equally preferred or randomly selected shortest physical paths suffer from reduced robustness and reduced peak traffic carrying capabilities. Robustness suffers when communications are not distributed among several different physical routes between origination and destination node pairs. When a link fails, all communications between the node pairs may be dropped. Traffic carrying capabilities suffer when many different routes, perhaps from different origination to destination node pairs, have a common communication link in their shortest path routes. When the communication traffic exceeds link capacity, the excess traffic may be dropped.

Furthermore, when the physical network configuration is dynamic, such as when network nodes move, routing solutions may be valid for only a brief duration. The calculation of routes for an extended duration may require numerous repetitive calculations to track the node movement. When techniques for calculating routes between origination and destination node pairs become complex, the time required to perform the calculations increases. Consequently, route calculation can take longer than the brief duration for which the route calculations remain valid. Accordingly, there is a significant need for a network and method which efficiently and quickly calculates communication routes between origination and destination node pairs for an entire network.

DESCRIPTION OF THE PREFERRED EMBODIMENTS

Figure 1:
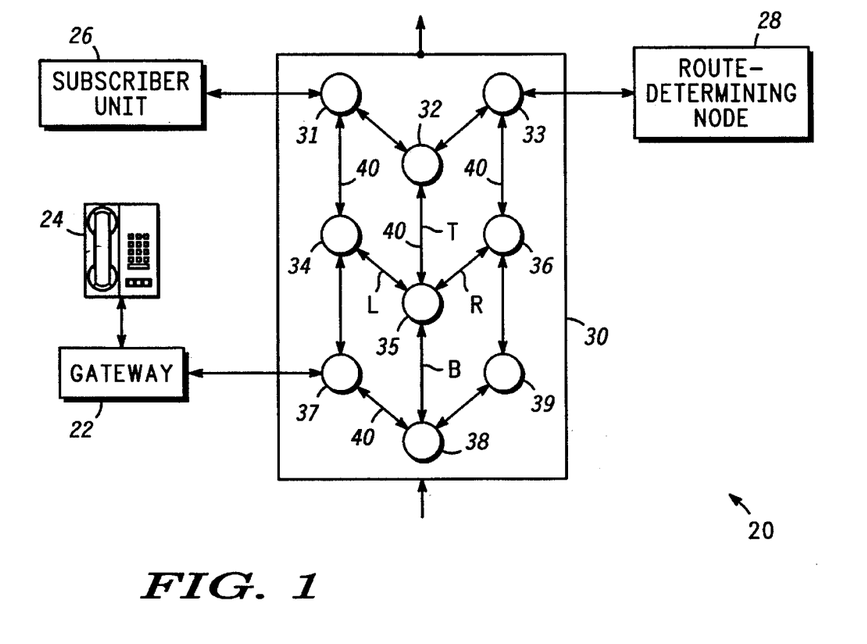
FIG. 1 shows a block diagram of a communications network.

FIG. 1 shows a block diagram of a communications network 20. In the preferred embodiments, network 20 includes any number of gateways 22, each of which couples to any number of telephonic devices 24, such as conventional telephone instruments, facsimile machines, modems, and the like. Likewise, network 20 includes any number, potentially but not necessarily in the millions, of subscriber units 26 and one or more route-determining nodes 28. Gateways 22, subscriber units 26, and route-determining nodes 28 use RF communications to communicate with one another through a constellation of switching nodes 30. In the preferred embodiments, the vast majority of subscriber units 26 are intended to be mobile units which may freely move anywhere on or near the surface of the earth and which may participate in one call at a time. Gateways 22 and route-determining nodes 28 are also located on or near the surface of the earth, but they may simultaneously participate in a multiplicity of independent calls. Nothing prevents a route-determining node 28 from also serving as a gateway 22, and vice-versa.

Constellation of switching nodes 30 includes any number of switching nodes, which are generally and/or collectively referred to as switching nodes 30 below. In the preferred embodiment, sixty-six switching nodes 30 are distributed in low earth, polar orbits to provide coverage over substantially the entire surface of the earth. The method and network work for any number of switching nodes 30. However, for clarity FIG. 1 illustrates only an example constellation which includes nine switching nodes, individually referred to as switching nodes 31–39.

In the preferred embodiment, switching nodes 30 move relative to the earth at speeds of around 25,000 Km/Hr and move relative to each other as their orbits converge while approaching the poles and diverge as they approach the equator. Gateways 22, subscriber units 26, and route-determining nodes 28, which may reside anywhere on the earth, communicate directly with a switching node 30 that is overhead at the moment the communications take place. However, due to the speed at which switching nodes 30 move, the switching node which supports a given earth-bound link changes from moment to moment.

In the preferred embodiments, gateways 22, route-determining nodes 28 and switching nodes 30 are all computer controlled equipment. In other words, each includes processors, controllers, or other programmable devices which cause the nodes to operate in accordance with computer software which is stored in a memory located in the node. Switching nodes 30 and gateways 22 include switching fabrics which are likewise computer controlled. The switching fabrics cause communications which enter the nodes on any of a variety of links to then leave the nodes over a variety of lo links. In the preferred embodiments, each switching node 30 has a switching capacity which matches the capacity of all links terminated at the node. In other words, when all links terminated at a switching node 30 carry their maximum amount of communication traffic, the switching node 30 can successfully switch the communication traffic as needed to allow the communication traffic to be delivered through network 20.

In particular, switching nodes 30 communicate with one another through communication links 40. Desirably, each switching node terminates two or more links 40. For clarity, FIG. 1 illustrates links 40 as terminating only at some neighbor nodes 30, with no links wrapping around between top and bottom or left and right sides of constellation 30. However, this is not a requirement of the present invention. As a general case, switching node 35 terminates four links 40, which couple to neighbor switching nodes 30 in top (T), bottom (B), left (L), and right (R) directions relative to switching node 35.

In network 20, a communication may originate at any location on or near the surface of the earth. The communication is routed through a gateway 22, subscriber unit 26, or route-determining node 28 to constellation 30. The one of switching nodes 31–39 which receives this up-link communication is considered the origination node for this communication. Network 20 routes the communication through switching nodes 31–39 in a manner which is described below. The one of switching nodes 31–39 from which the communication is down-linked to the surface of the earth to either a gateway 22, subscriber unit 26, or route-determining node 28 is considered the destination node. All switching nodes that receive the communication from another switching node and transmit the communication to another switching node are considered intermediate nodes.

As an example, FIG. 1 illustrates a scenario where a communication destined for subscriber unit 26 may originate at telephonic instrument 24, and pass through gateway 22, where it is up-linked to switching node 37. Switching node 37 is the origination node, and switching node 31 is the destination node. Network 20 has many options in selecting links 40 for use in routing the communication between origination node 37 and destination node 31. However, a route which passes from node 37, through node 34, to node 31 is desirable because it is a shortest path route. In other words, any other route would require the use of a greater number of links 40 to deliver the communication between origination and destination nodes 37 and 31. This route makes node 34 an intermediate node for this communication.

Shortest path routes are desirable because they minimize the delay involved in delivering the communication. In addition, they are desirable because they cause network 20 to expend fewer of its finite resources in delivering any single communication, which allows a greater number of resources to remain available for delivering other communications. Further, shortest path routes are more reliable because a failure of a link 40 somewhere in constellation 30 is less likely to affect a route which includes fewer links.

Figure 2:
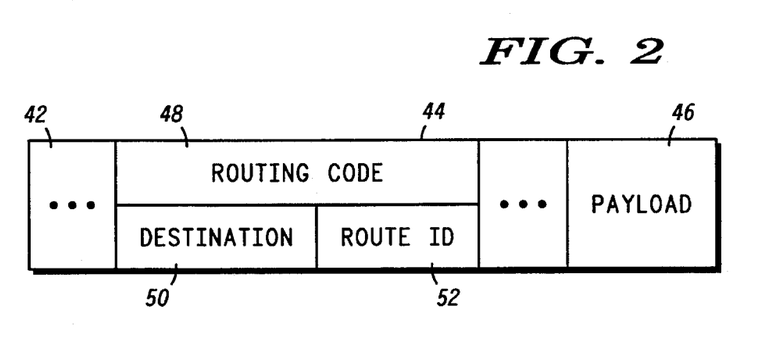
FIG. 2 shows a data format diagram of a data packet delivered by the communications network.

FIG. 2 shows a data format diagram of a digital data packet 42 delivered by network 20 (see FIG. 1) in the preferred embodiment. Packet 42 includes a header portion 44 and a payload portion 46. Payload portion 46 conveys the information whose delivery is the purpose for network 20. Header portion 44 conveys overhead data which network 20 uses to manage the delivery of payload portion 46. These overhead data include a routing code 48 which an origination switching node appends to payload data. The routing code defines the route that the packet 42 will take from its origination switching node, through intermediate switching nodes, if any, to its destination switching node.

Routing code 48 includes a destination node ID 50 and a logical route ID 52. Destination ID 50 identifies the destination switching node for packet 42. Route ID 52 specifies one of a plurality of logical routes to follow in delivering packet 42 to its destination switching node. Logical route IDs 52 are assigned to as many physically distinct routes as possible. All packets for a given call desirably follow the same route. As discussed in detail below, these different routes for different calls could be physically distinct routes and not merely logically distinct routes given different origination and destination node possibilities and link capacities within network 20. The use of physically distinct routes is desirable because it improves the robustness of network 20. If a link 40 (see FIG. 1) included in a given route between an origination and destination node pair fails, the amount of dropped communications between the node pair is reduced when more physically distinct routes are used for routing the calls.

Figure 3:
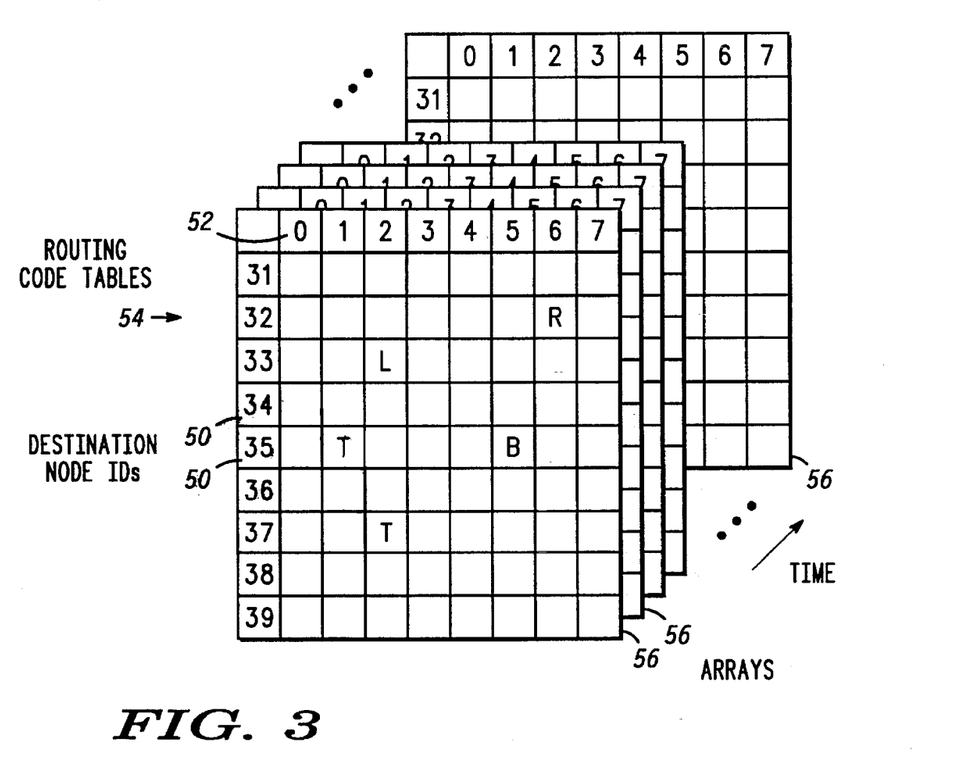
FIG. 3 shows a block diagram of a memory structure maintained at switching nodes within the communications network to define routing.

FIG. 3 shows a block diagram of an exemplary routing code table 54 which may be stored at each switching node 30. Each switching node 30 has its own version of table 54, and no two tables 54 need to be identical. Tables 54 are formed off-line at route-determining node 28 (see FIG. 1) and sent to switching nodes 31–39 before tables 54 are activated. FIG. 3 illustrates table 54 as being a three-dimensional memory structure. One dimension represents time, another represents route IDs 52 (see FIG. 2), and a third represents destination node IDs 50 (see FIG. 2). FIG. 3 depicts route IDs 52 using codes of zero through seven. Thus, for the example depicted in FIG. 3 each destination may be reached using any one of eight logically different routes. FIG. 3 depicts destination node IDs 50 using the codes of 31–39 to correspond with the switching nodes 31–39 illustrated in FIG. 1.

A single destination node/route ID array 56 is activated for a given epoch, and table 54 may include any number of arrays 56 to describe routing for any number of epochs. Different arrays 56 are associated with different epochs to track the movement of constellation 30 (see FIG. 1). A routing scheme which may be valid at one moment and defined in one array 56 becomes invalid the next, but another array 56 will define a valid routing scheme for that next moment. In the preferred embodiment, the epochs may be separated from another by a duration of several seconds to a few minutes. All epochs taken together span a period of time called a planning period. In the preferred embodiments, the planning period lasts longer than 30 hours and is desirably updated at least once a day. Thus, switching nodes 30 continue to possess valid routing definitions, and these definitions remain valid for several hours should communications with route-determining node 28 become temporarily interrupted.

As discussed above, the origination switching node appends routing code 48 (see FIG. 2) to a packet 42 (see FIG. 2) when the packet's payload data 46 is received over an up-link. When the origination and intermediate switching nodes 30 obtain a packet 42 to which routing code 48 has been appended, they use the routing code 48 as an index into one of their arrays 56 which is activated for the instant in time when the packet 42 is received. The array 56 produces an identity code for a link 40 (see FIG. 1) to use in routing the packet 42 onto its destination, and the switching node routes the packet 42 in response to this identity code. When the packet 42 arrives at its destination switching node, either array 56 or other controls route the packet 42 on a down-link to a gateway 22, subscriber unit 26, or route-determination node 28 (see FIG. 1). In the example depicted in FIGS. 1 and 3, the identity codes for links 40 specify top (T), bottom (B), left (L), or right (R) links for different routing scenarios.

Figure 4:
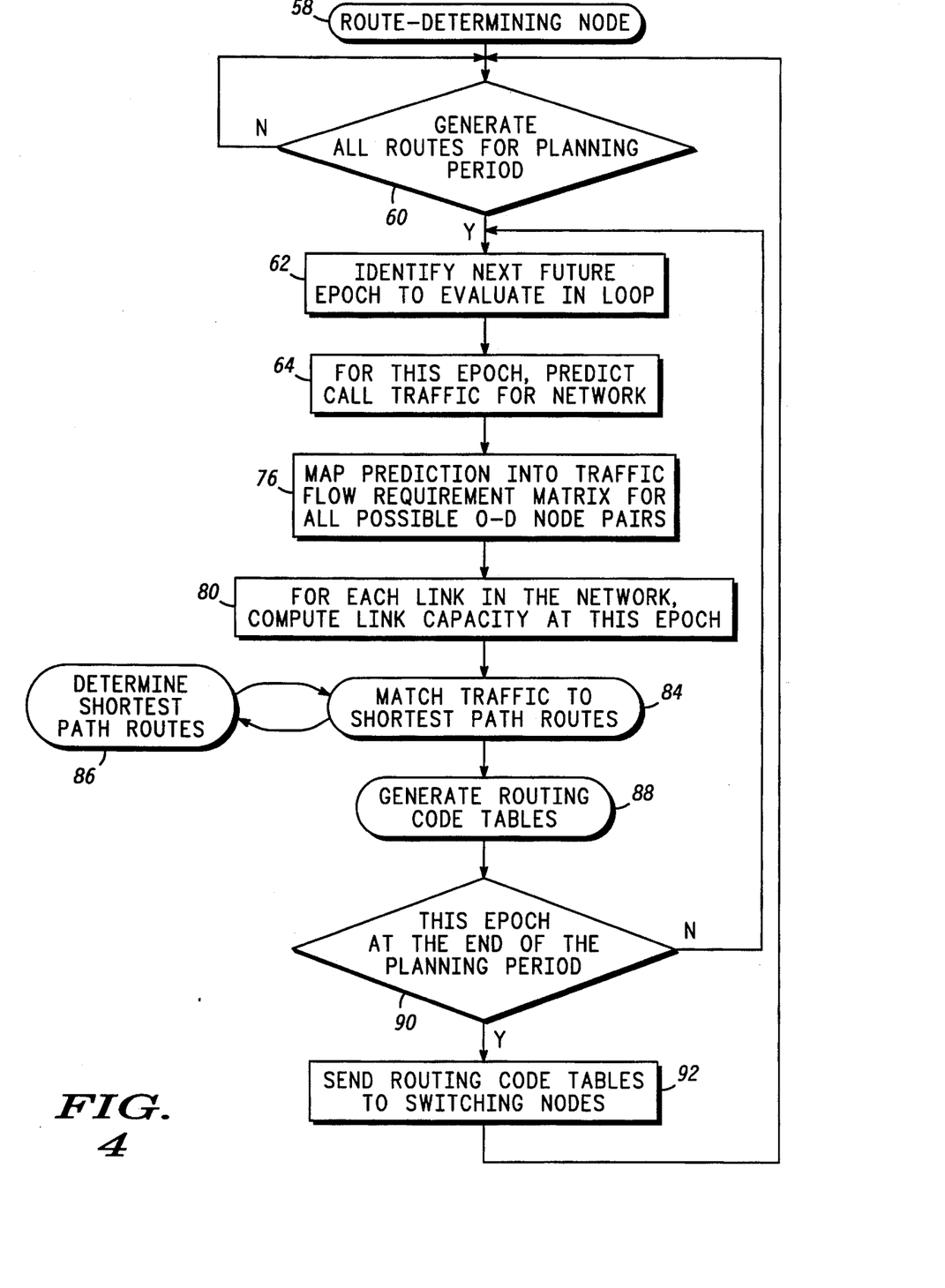
FIG. 4 shows a flowchart of a procedure performed by a route-determining node.

FIG. 4 shows a flowchart of a procedure 58 performed by route-determining node 28. Procedure 58 is performed by processing, controller, or like devices which operate in response to software programming instructions stored in a memory of node 28. Nothing prevents procedure 58 from performing numerous steps which are not related to the present invention. However, procedure 58 includes a query step 60 which determines whether to generate all routes used by network 20 for an upcoming planning period. Step 60 may respond to the current time so that network routes are automatically generated on a predetermined schedule, or step 60 may respond to user input provided by a human operator at node 28 or elsewhere. When step 60 determines not to generate network routes, program control loops to perform other steps not related to the present invention and to return to step 60 at a later time.

When step 60 causes route-determining node 58 to generate network routes, step 62 identifies a next future epoch to evaluate in a programming loop. Step 62 is performed in a programming loop which generates a complete routing plan for the entire network 20 at a given epoch. One iteration of this loop is performed for each epoch, and this loop is desirably performed a sufficient number of iterations to generate routing for an entire future planning period. Tables 54 (see FIG. 3) for each switching node 30 result from the execution of this loop.

The first iteration of step 62 identifies the first epoch to include in the upcoming planning period. This first epoch is sufficiently far into the future to allow plenty of time for generating network routes for the entire planning period which follows the first epoch and for communicating the resulting tables 54 to their respective switching nodes 30. Thus, tables 54 are communicated to switching nodes 30 prior to the epochs for which they were designed, where they are then activated when the corresponding epochs actually occur.

Figure 5:
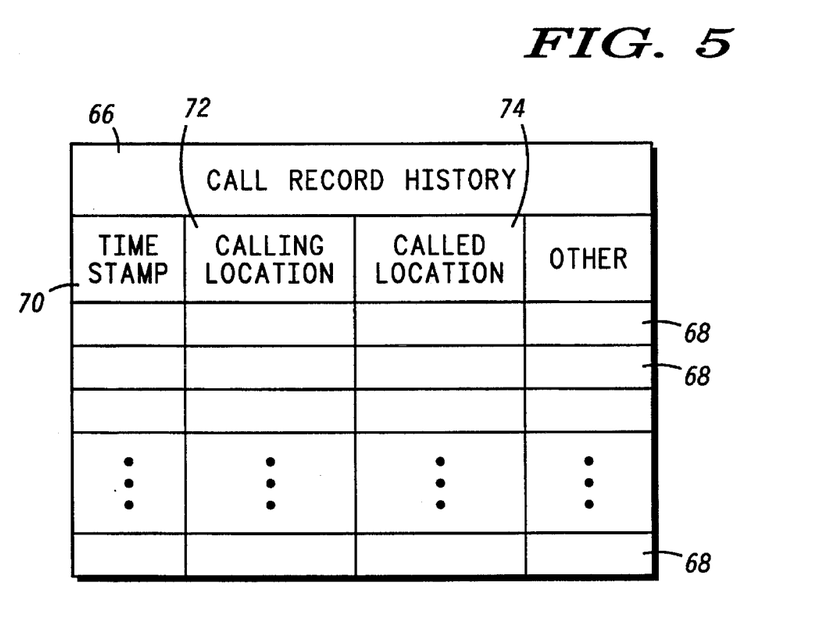
FIG. 5 shows a block diagram of an exemplary call record history file which may be used to predict future call traffic.

After step 62, step 64 predicts call traffic for network 20 at the epoch currently being evaluated by procedure 58. The preferred embodiments predict future call traffic to be substantially the same (i.e., statistically similar) as past call traffic. FIG. 5 shows a block diagram of an exemplary call record history file 66 which may be used to predict future call traffic. Referring to FIG. 5, file 66 depicts any of the many types of call record files conventionally collected in telephony systems. File 66 includes call records 68 which describe calls that have been serviced by network 20 during some period of interest in the past. Each record 68 includes a time stamp field 70 that indicates when the call was placed and either the call termination time or the call duration. Each record 68 also includes a calling location field 72 and a called location field 74. Each record 68 may include other fields as well. Calling location and called location fields 72 and 74 recite phone numbers or other data which may be translated into at least rough indications of the geographic locations of the parties making and receiving calls.

Referring back to FIG. 4, step 64 performs translations which may be needed upon call history file 66 (see FIG. 5) to allow it to serve as a prediction of the number of calls which will be ongoing between all possible origination and destination locations on the earth for the subject epoch. The translations may include associating particular switching nodes 30, which are moving in overhead orbits, with geographic location data for the subject epoch. While the preferred embodiments desirably use past call record data to predict future call traffic requirements, nothing prevents refinements from being incorporated. For example, call record data from an epoch approximately 24 hours, or integer multiples thereof, earlier than the subject epoch may serve as a better predictor for the subject epoch than other periods. In addition, factors may be included to accommodate weekend, holiday, and emergency situations.

Figure 6:
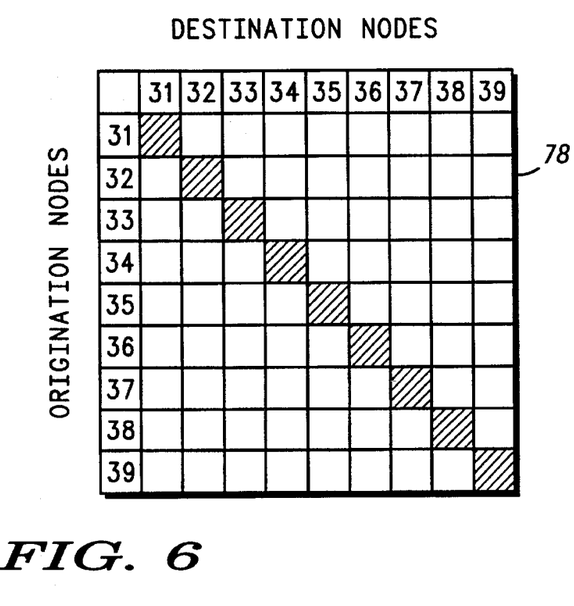
FIG. 6 shows a block diagram of an exemplary traffic flow requirement matrix prepared by the route-determination node.

After step 64, step 76 maps the predicted call traffic for the subject epoch into a traffic flow requirement matrix 78 for all possible origination-destination (O-D) switching node pairs. FIG. 6 shows a block diagram of an exemplary traffic flow requirement matrix 78. FIG. 6 illustrates matrix 78 as being a two-dimensional array with one dimension listing all possible origination nodes and the other dimension listing all possible destination nodes. FIG. 6 depicts the switching nodes 31–39 in the origination and destination roles for consistency with the example constellation depicted in FIG. 1. However, those skilled in the art will appreciate that the preferred embodiment and other networks which include more switching nodes will utilize a larger matrix 78.

Each element in matrix 78 is associated with an O-D node pair, and all possible combinations of O-D node pairs are represented in matrix 78. For the purposes of the present invention, elements may be omitted where the same switching node 30 would serve as both origination and destination because no routing through constellation 30 is required for this situation. Each element of matrix 78 quantifies a predicted number of calls for the subject epoch having the specified origination switching node and destination switching node. Referring back to FIG. 4, step 76 maps prediction data into matrix 78 (see FIG. 6) by evaluating the orbital geometry for constellation 30 to identify the switching nodes 30 which will be in position to service the calling and called locations 72 and 74 (see FIG. 5) for the predicted calls in the subject epoch.

Figure 7:
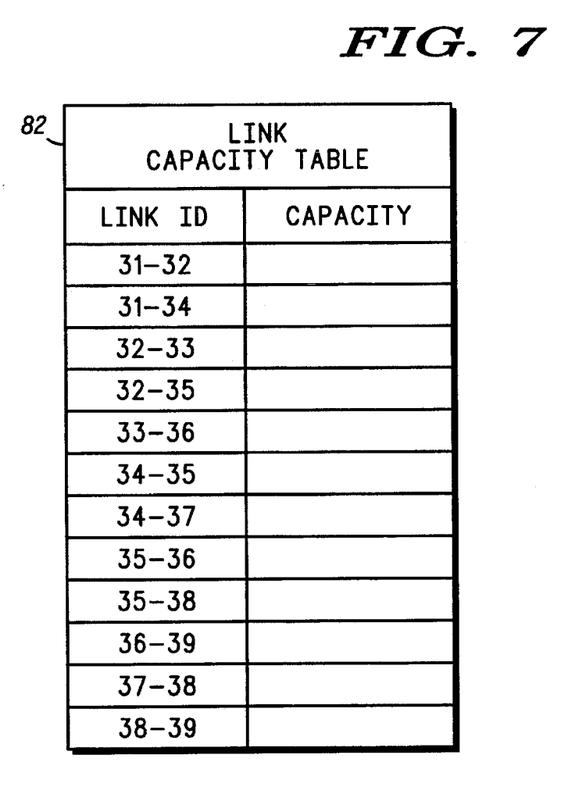
FIG. 7 shows a block diagram of an exemplary link capacity table prepared by the route-determination node.

After step 76, step 80 computes the link capacities for each link 40 in network 20 during the subject epoch. FIG. 7 shows a block diagram of an exemplary link capacity table 82 that may be prepared during step 80. Referring to FIG. 7, table 82 identifies each link 40 (see FIG. 1) in network 20 and associates a capacity number with each link 40. FIG. 7 identifies the twelve links 40 which are illustrated in the example constellation 30 depicted in FIG. 1. Of course, the preferred embodiment and other networks which have a greater number of switching nodes will identify many more links 40. FIG. 7 depicts table 82 as identifying links 40 using the IDs of the switching nodes which terminate the links 40, but other embodiments may utilize other identifying methodologies.

Referring back to FIG. 4, the capacity numbers determined by step 80 for table 82 (see FIG. 7) desirably result from numerous considerations. For example, several links 40 may have zero capacity. The zero capacity links 40 may be those that have failed or have been shut down for one reason or another. Failed links may have failed due to an isolated component failure on either switching node 30 supporting the link 40 or by failure of an entire switching node 30. Links 40 may occasionally be intentionally shut down to prevent interference, such as when moving switching nodes move closer together (e.g., where polar orbits converge over the poles) or to conserve power or to perform tests.

In addition, the capacity numbers arrived at by step 80 for the purpose of routing predicted traffic are desirably less than the actual maximum capacity for the links. Desirably, the maximum capacity numbers generated in step 80 are a specified fraction of the actual maximum capacity or a predetermined offset number of calls less than the actual maximum capacity. This reduced maximum capacity number is desirable because route-determining node 28 will determine routing at predicted traffic levels. Actual traffic will vary from the predicted traffic. The calculation of routing based upon reduced maximum link capacities allows network 20 to successfully route communications which exceed the predicted traffic levels.

After step 80, process 84 matches the predicted traffic to the shortest path routes between various origination and destination nodes for constellation 30. Process 84 is discussed below in connection with FIG. 8. Process 84 relies upon process 86, which determines the shortest path routes currently available in the constellation defined by link capacity table 82. Process 86 is discussed below in connection with FIG. 9. After process 84 matches predicted traffic to shortest path routes, process 88 generates routing code tables 54 (see FIG. 3) for switching nodes 30. Process 88 is discussed below in connection with FIG. 16.

When routing code tables have been generated for the subject epoch, query step 90 determines whether the subject epoch occurs at the end of the subject planning period. If the subject epoch is not the last epoch in the planning period, program control loops back to step 62 to identify the next epoch and repeat the routing code table generation process for this next epoch. When step 90 determines that the last epoch in the planning period has been evaluated, step 92 formats the data as needed and sends routing code tables 54 to the respective switching nodes 30. As discussed above, switching nodes 30 will subsequently activate epoch arrays 56 of tables 54 when the related epochs actually occur and route packets 42 (see FIG. 2) in response to the routing codes 48 (see FIG. 2) conveyed by the packets 42 and in response to the activated epoch array 56 data.

Figure 8:
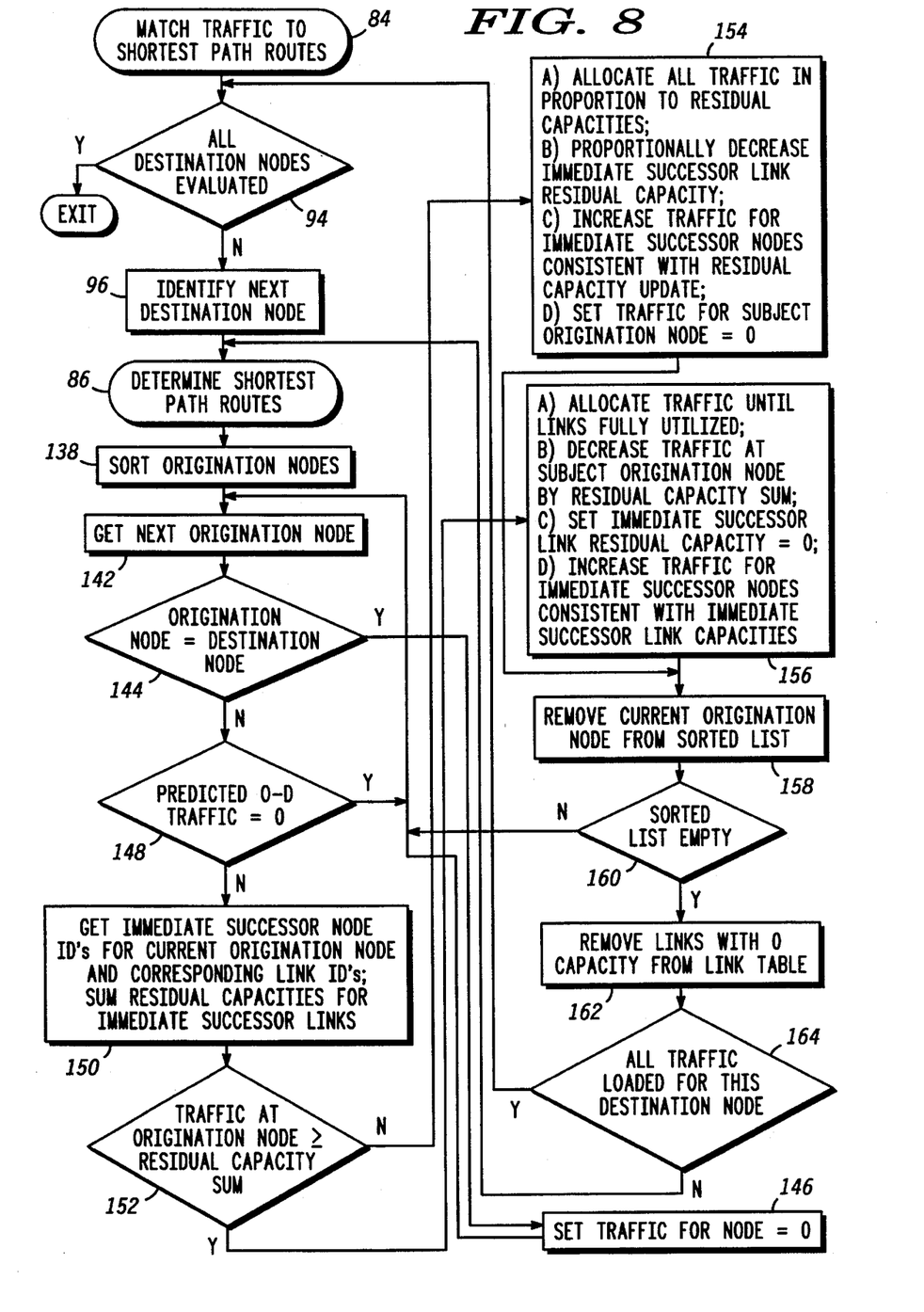
FIG. 8 shows a flowchart of a process for matching traffic to shortest path routes.

FIG. 8 shows a flowchart of process 84, which matches predicted communication traffic to shortest path routes. Process 84 includes an arrangement of nested programming loops. Within the outer loop in this nested arrangement a specified switching node 30 acting in the role of a destination node is evaluated. This outer loop is performed until eventually all switching nodes 30 have been evaluated in the destination node role. In particular, a query step 94 determines whether all destination nodes have been evaluated yet. When all switching nodes have been evaluated in the destination node role, program control exits process 84 and proceeds to process 88, as indicated in FIG. 4.

When step 94 determines that additional destination nodes require evaluation, step 96 identifies the next switching node to evaluate in the destination node role. After step 96 identifies a specific destination node, program control proceeds to process 86, which determines the shortest path routes for the subject destination node.

Figure 9:
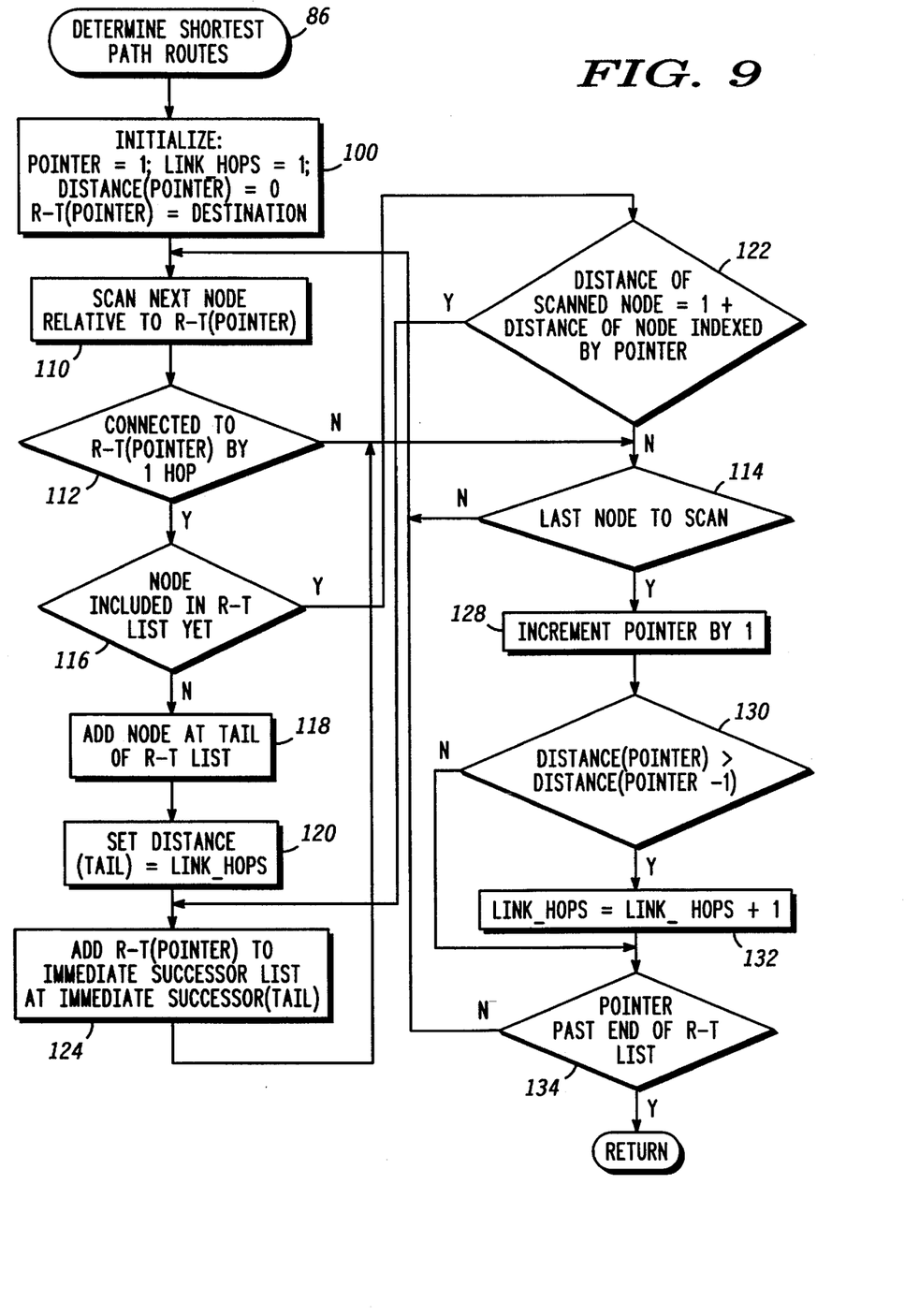
FIG. 9 shows a flowchart of a process for determining shortest path routes.
Figure 10:
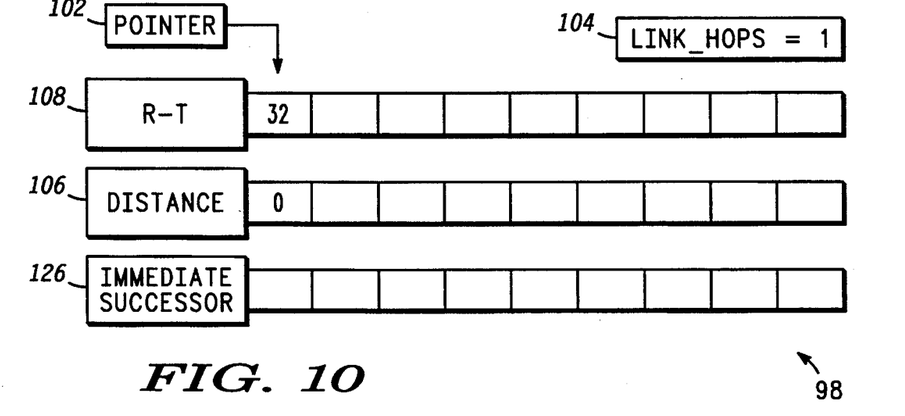
FIG. 10 shows a block diagram of a first state of an exemplary memory structure prepared by the route-determination node in determining shortest path routes.

FIG. 9 shows a flowchart of process 86. Generally, process 86 performs a breadth-first search relative to the subject destination node. However, process 86 augments the process of conventional breadth-first searches by a backward pass so that all possible shortest path routes for the destination node are specified rather than only one shortest path route. At the beginning of process 86, those nodes which are one link hop away from the destination node are identified. Later, those nodes which are two and three link hops away from the destination node will be identified. FIG. 10 shows a block diagram of a first state of an exemplary memory structure 98 maintained by process 86. In particular, FIG. 10 depicts a memory structure 98 formed for the example network configuration illustrated in FIG. 1, which includes switching nodes 31–39. FIG. 10 further depicts an example situation where switching node 32 serves as the destination node.

Referring to FIGS. 9 and 10, process 86 performs step 100 to perform various initializations. In particular, "pointer" 102 is set to the first entry (treated as the top most), and "link_hops" variable 104 is set to a value of one. An element of a "distance" list 106 indexed by the pointer variable (i.e. the first element) is set to a value of zero, and an element of a route tree (R_T) list 108 indexed by the pointer variable is set to the destination node ID (DEST), which is switching node 32 in this example.

After step 100, process 86 evaluates each node in the constellation which terminate a link 40 in common with the node indexed by pointer 102. Query step 112 makes sure that each node being evaluated is connected to the node indexed by pointer 102 in R-T list 108 by one hop over a link 40. Step 112 may evaluate link capacity table 82 (see FIG. 7) in making its determination. If links 40 having a capacity of zero are included in table 82, such links are deemed not to connect. If a node being evaluated is not connected, then it need not be further evaluated, and query step 114 determines whether it was the last node to evaluate relative to the node indexed by pointer 102 in R-T list 108. So long as step 114 determines that other nodes 30 need to be evaluated, program control loops back to step 110 to identify the next node to evaluate.

When step 112 determines that an evaluated node is connected to the node indexed by pointer 102 in R-T list 108, query step 116 determines whether this node being evaluated has already been included in R-T list 108. If the scanned node has not been included, step 118 includes the scanned node's ID at the tail, bottom or current end of R-T list 108, and step 120 sets the tail element of distance list 106 to the variable link_hops 104 and step 124 includes the node indexed by pointer 102 as an immediate successor of the node being scanned. When step 116 determines that the scanned node is already included in R-T list 108, query step 122 determines whether the distance of the scanned node is exactly one greater than the distance of the node indexed by pointer 102. If true, the node indexed by pointer 102 is included as an immediate successor of the scanned node in step 124. Otherwise, scanning of the node is finished. Program control loops back to step 114 to scan the next node until all other nodes have been scanned.

For the purposes of the present invention, an immediate successor of the node being scanned is a node contained on a shortest path from it to the destination node. The immediate successor node is one link away from the node to which it is an immediate successor, and this one link is in the direction of the destination node. In particular, step 124 adds the ID of the node indexed by pointer 102 in R-T list 108 to the element at the tail of an immediate successor (I-S) list 126. Each element of I-S list 126 may record several different immediate successors. After step 124, program control loops back to step 114 to scan the next adjacent node until all other nodes have been scanned.

When step 114 determines that all adjacent nodes have been scanned relative to the node indexed by pointer 102 in R-T list 108, step 128 increments pointer 102 by one. At this point, pointer 102 indexes a node included in R-T list 108 during a previous scan. Next, query step 130 determines whether the distance of the element now indexed by pointer 102 is greater than the distance of the element previously indexed by pointer 102. When this situation occurs, future scanning will take place relative to a node that is removed from the destination node one link hop farther than the previous scan. Accordingly, step 132 increments link_hops variable 104 by one to reflect the increased distance from the destination node. After step 132 and when this situation is not detected, program control proceeds to step 134 to determine whether pointer 102 indexes past the end of R-T list 108. So long as pointer 102 continues to index elements of R-T list 108, program control loops back to step 110 to scan the network nodes connected by a link to the indexed node. When pointer 102 indexes past R-T list 108, process 86 is completed, and program control returns to process 84 (see FIG. 8).

Figure 11:
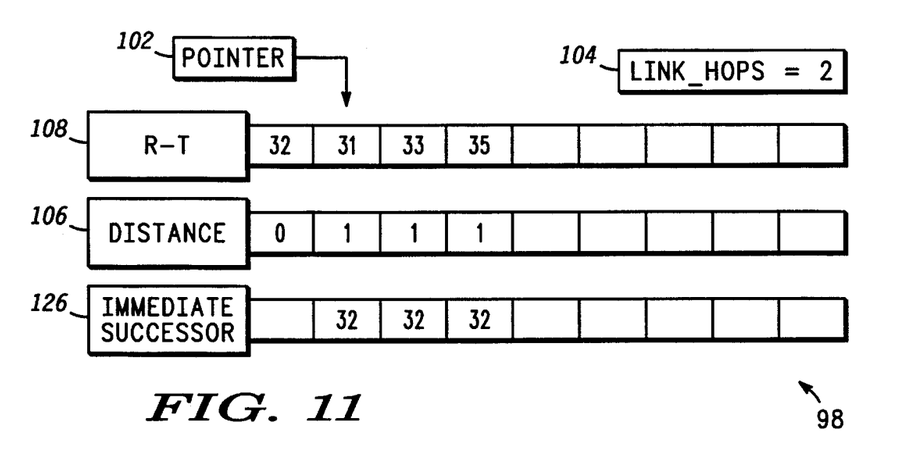
FIG. 11 shows a block diagram of a second state of an exemplary memory structure prepared by the route-determination node in determining shortest path routes.
Figure 12:
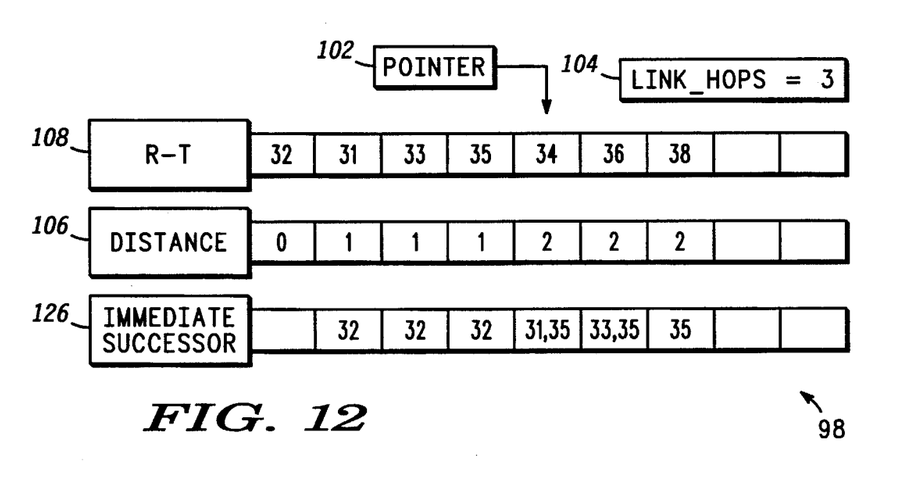
FIG. 12 shows a block diagram of a third state of an exemplary memory structure prepared by the route-determination node in determining shortest path routes.
Figure 13:
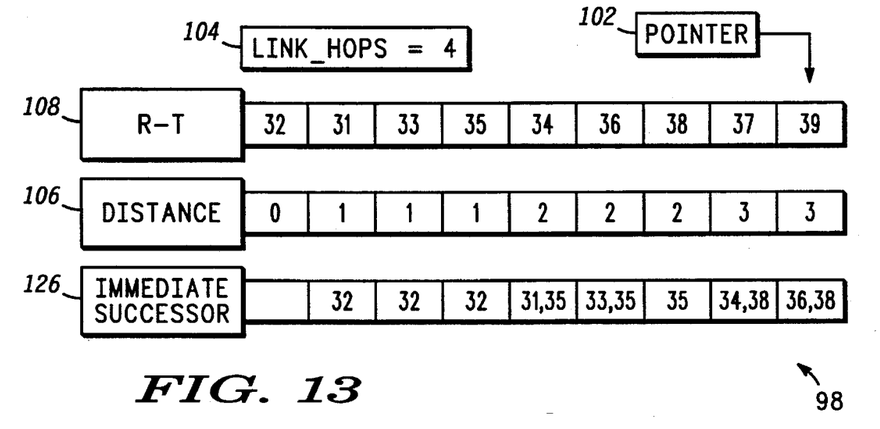
FIG. 13 shows a block diagram of a fourth state of an exemplary memory structure prepared by the route-determination node in determining shortest path routes.

As discussed above, FIG. 10 depicts the state of memory structure 98 immediately after initialization step 100. FIGS. 11, 12, and 13 also depict memory structure 98 for the same example situation of a constellation with switching nodes 31–39 where node 32 is the destination node. In particular, each of FIGS. 11–13 depicts the state of memory structure 98 after the execution of step 132. At step 132, pointer 102 has been incremented to index a node in R-T list 108 that is at a greater distance from the destination node than the previous node indexed by pointer 102. Furthermore, at step 132, link_hops variable 104 has just been incremented to reflect the new distance which will be recorded for subsequent entries into distance list 106. As shown in FIGS. 12 and 13, multiple immediate successor nodes have been recorded for nodes 34, 36, 37, and 39.

Figure 14:
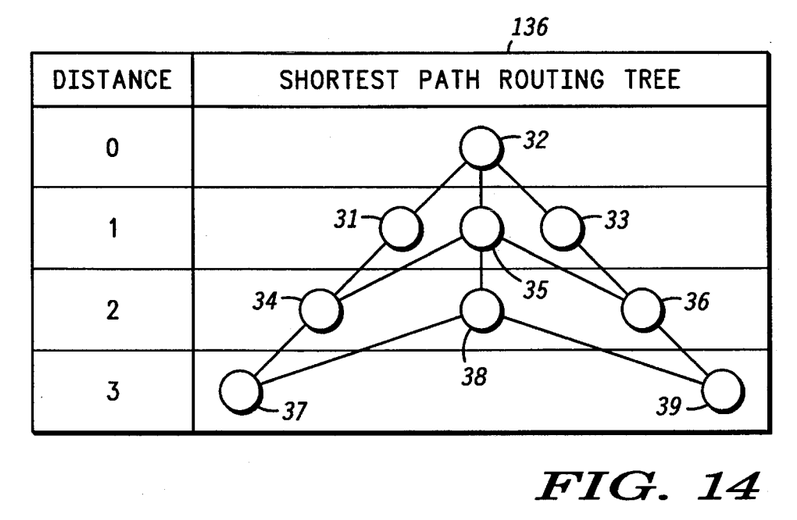
FIG. 14 shows a graphical depiction of a routing tree which depicts all shortest path routes for a given destination node in an exemplary network.

FIG. 14 shows a graphical depiction of a shortest path routing tree 136 for the example situation depicted in FIGS. 10–13. In fact, routing tree 136 depicts the same information which is conveyed by memory structure 98 in FIG. 13, where process 86 (see FIG. 9) ends. FIG. 14 depicts multiple immediate successor nodes for nodes 34, 36, 37, and 39 by showing two shortest paths leading away from each of nodes 34, 36, 37, and 39 toward destination node 32. These multiple immediate successor nodes lead to physically distinct shortest path routes. For example, three physically distinct shortest path routes are available from origination node 37 to destination node 32. These routes are 37-34-31-32, 37-34-35-32, and 37-38-35-32. Each route requires three links or link hops, and no other route having fewer links can be arranged through the constellation 30 depicted in FIG. 1.

Those skilled in the art will appreciate that fewer physically distinct shortest path routes are available when origination and destination nodes are nearer one another. For example, routing tree 136 indicates that only one shortest path route is available from each of origination nodes 31, 35, and 33 to destination node 32. However, as the number of nodes in constellation 30 increases, the number of far apart origination-destination (O-D) node pairs also increases. In addition, the number of physically distinct shortest path routes increases. The matching of predicted traffic to shortest path routes performed in route-determination node 28 (see FIG. 1) desirably splits traffic among physically distinct shortest path routes as much as possible to improve network robustness. When physically distinct shortest path routes are not available, such routes are typically shorter and less vulnerable to link failures since they use fewer links. The more vulnerable the routes become to link failures due to the use of many links, the more they may be split among physically distinct shortest path routes.

Figure 15:
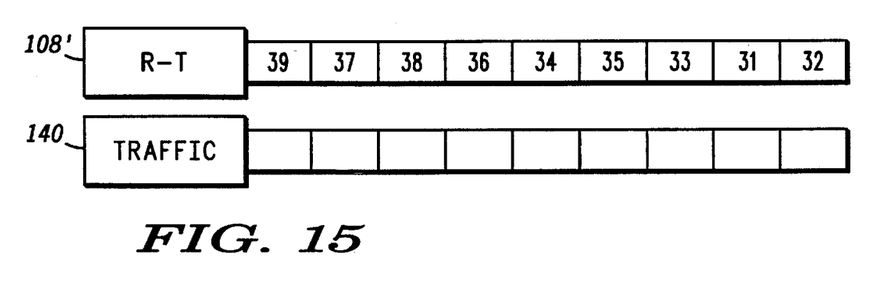
FIG. 15 shows an exemplary routing tree (R-T) list used in matching traffic to shortest path routes.

FIG. 15 shows an exemplary routing tree (R-T) list 108 used in matching traffic to shortest path routes. Referring to FIGS. 8 and 15, when process 86 has determined the shortest path routes for the subject destination node, step 138 sorts the nodes from R-T list 108 (see FIG. 13) into a desirable sequence, which FIG. 15 indicates as being in decreasing distance order to the destination node 32. Thus, an R-T list 108' shown in FIG. 15 places the destination node at its tail since it is at a distance of 0. The switching nodes 30 include in list 108' are then evaluated in the role of origination (ORIG) nodes. In addition, a traffic list 140 may be initialized from traffic flow requirement matrix 78 (see FIG. 6). Traffic list 140 associates a traffic quantity with each node from list 108'. The traffic quantity represents the predicted traffic (i.e. number of calls) from each origination node to all destination nodes, as indicated in matrix 78.

After step 138, process 84 enters a loop where all switching nodes will be evaluated in an origination node role. Step 142 gets the next origination (ORIG) node from R-T list 108'. For the first iteration of the loop, the next origination node is the first node in R-T list 108', which FIG. 15 depicts as being node 39. After step 142, query step 144 determines whether the origination node from R-T list 108' is the same as the subject destination node, identified above in step 96. If the two nodes are the same, then no traffic needs to be allocated, and step 146 sets the traffic associated with the node in list 140 to zero because this traffic need not be routed further within constellation 30. After step 146, program control loops back to step 142 to get the next origination node. Those skilled in the art will appreciate that the ordering of origination nodes depicted in FIG. 15 will route traffic from the origination nodes farthest from the destination node toward the destination node. This ordering actually prevents step 146 from being performed because all traffic will be loaded prior to evaluating the destination node. However, other ordering schemes may route traffic outward from the destination node rather than vice versa. In such cases, step 146 may be performed.

When step 144 determines that the origination node is not the same as the destination node, query step 148 determines whether the predicted origination-destination (O-D) traffic is zero. If the predicted traffic is zero, then process 84 need not allocate traffic to links 40, and program control loops back to step 142 to get the next origination node.

When step 148 determines that the predicted O-D traffic is not zero, step 150 gets the immediate successor (I-S) node IDs for the subject origination node and the corresponding link IDs for the links 40 terminating at the subject origination node and immediate successor nodes. Step 150 may consult routing tree 136 (see FIG. 14) or I-S list 126 (see FIG. 13) to identify the immediate successor nodes. Step 150 may consult link capacity table 82 (see FIG. 7) to identify the corresponding links 40 and their residual capacities. In addition, step 150 sums the residual capacities for all the identified immediate successor links. However, process 84 decreases these maximum capacities as traffic is matched with shortest path routes. Thus, capacities indicated in table 82 during the various iterations of step 150 represent residual or remaining capacities for the links.

After step 150, query step 152 determines whether the traffic indicated for the origination node is greater than or equal to the residual capacity sum calculated above in step 150. In the normal situation, the origination node traffic is less than the total residual capacity for the links to immediate successors, and program control proceeds to step 154. In sub-step A), step 154 allocates all the traffic from the origination node along immediate successor links in proportion to their residual capacities. Step 154 performs sub-steps B), C) and D) to match traffic to the immediate successor links included in shortest path routes. In sub-step B, immediate successor (I-S) link residual capacity is decreased by the amount of traffic allocated on it in sub-step A) and the revised residual link capacity is indicated in table 82 (see FIG. 7). In sub-step C, traffic for immediate successor (I-S) nodes is increased to reflect the amount of traffic which was just allocated over the corresponding immediate successor links. This increase is reflected in traffic list 140 (see FIG. 15). For example, if 100 calls were allocated over link 36–39, and 200 calls were allocated over link 38–39, then residual capacity for link 36–39 would be decreased by 100 calls, residual capacity for link 38–39 would be decreased by 200 calls, traffic for node 36 would be increased by 100 calls, and traffic for node 38 would be increased by 200 calls. In sub-step D, the traffic for the subject origination (ORIG) node is set to zero because all traffic has been allocated over immediate successor links to immediate successor nodes.

Occasionally, step 152 will determine that the origination node traffic is greater than the total residual capacity for the links to immediate successors, and program control will proceed to step 156 to allocate as much of the traffic as possible. In sub-step A), step 156 allocates the traffic from the origination node to each immediate successor link until it is fully utilized to its limit. Then step 156 performs sub-steps B), C), and D). In sub-step B, traffic at the subject origination (ORIG.) node is decreased by the residual capacity sum for all immediate successor nodes. In other words, the immediate successor links become fully loaded. This decrease is reflected in traffic list 140 (see FIG. 15). Sub-step C sets the immediate successor (I-S) link residual capacities to zero by appropriate entries in table 82 (see FIG. 7). Sub-step D increases the traffic for the immediate successor nodes by the amount of traffic which was just allocated over links to these nodes.

After either of steps 154 or 156, step 158 removes the subject origination node from sorted R-T list 108' (see FIG. 15), and a query step 160 determines whether R-T list 108' is now empty. So long as R-T list 108' includes other origination nodes, program control loops back to step 142 to evaluate these other nodes. Eventually, when step 160 determines that R-T list 108' is empty, step 162 removes links 40 with a residual capacity of zero from link capacity table 82 (see FIG. 7). Next, query step 164 determines whether all traffic has been loaded for the destination node. Step 164 may investigate traffic list 140 to make its determination. Then program control loops back to step 94 to evaluate the next switching node as a destination node, until the operation of matching traffic to shortest path routes to all destination nodes is completed.

However, when R-T list 108' is empty but not all traffic has been loaded, fully loaded links have been encountered, and these fully loaded links have prevented the loading of all predicted traffic to the shortest path routes. In this situation, step 164 causes program control to proceed back to process 86. Process 86 is performed to again determine shortest path routes to the same destination node. However, this iteration of process 86 evaluates a different network than the prior iteration. In particular, the fully loaded links have been removed from the network definition through step 162. Consequently, process 86 will identify only shortest path routes which include links 40 having non-zero residual capacity. Some of these shortest path routes may in fact be longer than shortest path routes identified in previous iterations of process 86. However, they are the shortest path routes for the newly defined network configuration, and they are still the shortest path routes which may be accommodated while being responsive to the predicted traffic at the subject epoch. Now the remaining traffic is matched to these newly found shortest paths in the residual network using the same procedure outlined in FIG. 8 by entering step 84 and repeating the process.

Figure 16:
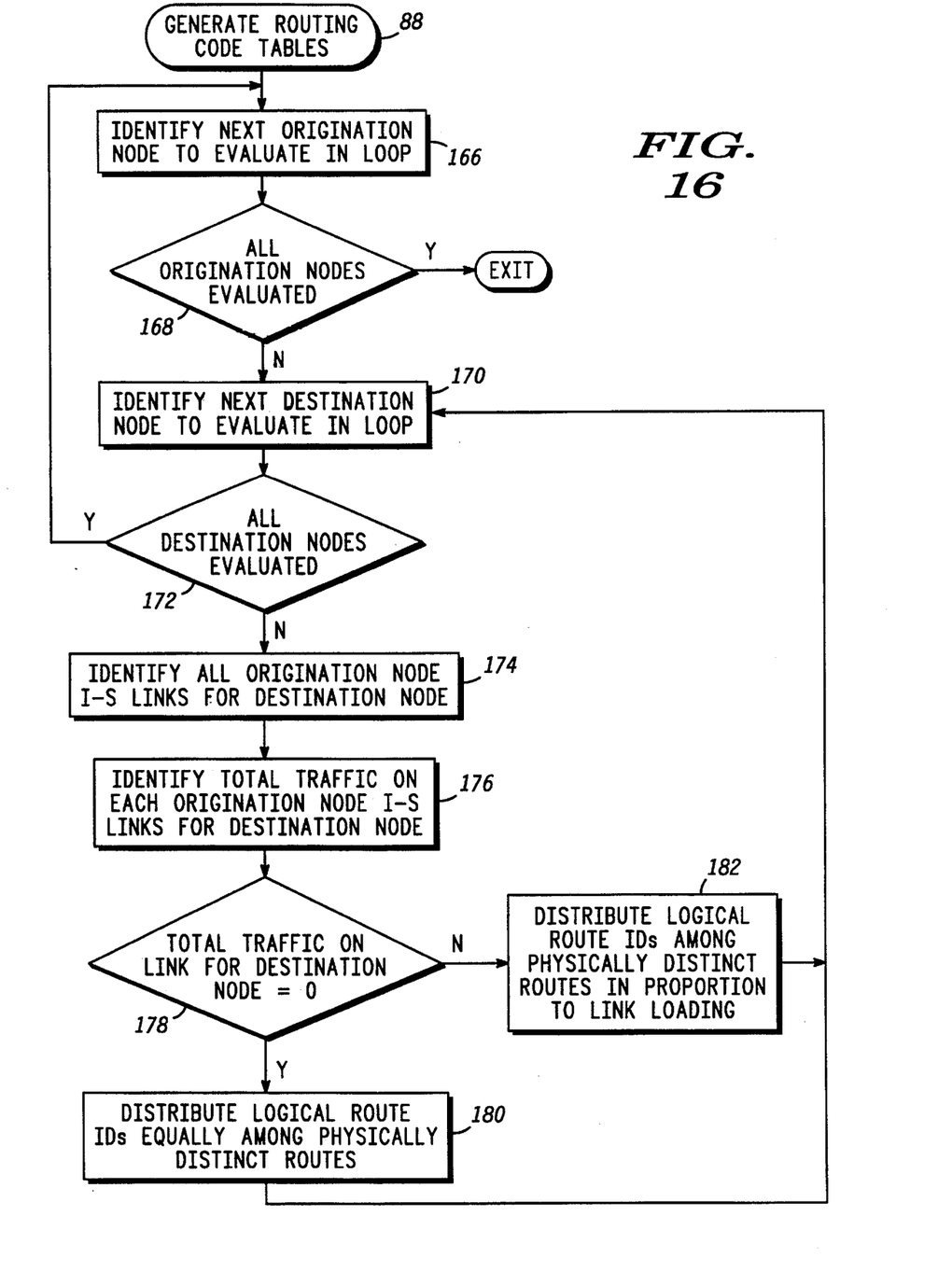
FIG. 16 shows a flowchart of a process for generating routing code tables.

FIG. 16 shows a flowchart of process 88, which route-determining node 28 performs after matching traffic to shortest path routes. Process 88 generates routing code tables 54 (see FIG. 3) for use by switching nodes 30. Generally, process 88 implements an outer programming loop to evaluate each switching node 30 in an origination node role one at a time, an intermediate programming loop to evaluate each switching node 30 in a destination node role, and an inner loop to evaluate each link 40 for the subject origination nodes. Process 88 evaluates the predicted traffic flow loaded on each link 40 relative to every possible destination node in associating route IDs 52 (see FIG. 2) with each switching node's links.

In particular, step 166 identifies a next switching node considered in an origination node role to evaluate in a programming loop. Step 166 is repetitively performed in a programming loop, and step 166 identifies any origination node during the first iteration. Next, query step 168 determines whether all origination nodes have been evaluated. When all have been evaluated, program control exits process 88 and proceeds to step 90 (see FIG. 4).

When step 168 selects an origination node to evaluate, step 170 identifies a next switching node considered in a destination node role to evaluate in a programming loop. Step 170 is repetitively performed in a programming loop, and step 170 identifies any destination node during the first iteration. Next, query step 172 determines whether all destination nodes have been evaluated. When all have been evaluated, program control loops back to step 166 to evaluate another origination node.

When step 172 selects a destination node to evaluate, step 174 identifies all the immediate successor links 40 terminated by the subject origination node to evaluate in a programming loop. Such links 40 may be designated as top (T), bottom (B), left (L), and right (R) links (see FIG. 1). Next, step 176 identifies the total traffic on each of the subject origination node I-S links for the destination node.

Step 178 determines whether the total traffic on each of the subject origination node I-S links toward the subject destination node is zero. In other words, step 178 determines whether process 84 (see FIGS. 4 and 8) matched zero predicted traffic with shortest routes that include these links. If no traffic was allocated over these links for the subject destination node, step 180 is performed.

Step 180 distributes route IDs 52 roughly equally among the immediate successor node of the subject origination node for the destination node. By distributing route IDs 52 roughly equally, actual traffic will be distributed roughly equally among the routes identified above in processes 84 and 86 (see FIG. 4). As discussed above, a finite number of route IDs are permitted in routing code 48 (see FIG. 2). In particular, $2^N$ route IDs are permitted by the N bits of routing code 48 that are allocated to route IDs. In the preferred embodiment, eight route IDs are permitted through the use of three bits in routing code 48. When less than $2^N$ shortest paths exist for a given origination-destination node pair, multiple route IDs are associated with physically distinct routes. Thus, $2^N$ logical routes are specified, and these $2^N$ logical routes are assigned to as many physically distinct shortest path routes as possible. Step 180 assigns roughly equal numbers of distinct logical route IDs to each physically distinct shortest route in this case.

When step 178 determines that predicted traffic was allocated over some subject origination node I-S links for the subject destination node, step 182 is performed. Step 182 distributes route IDs 52 roughly in proportion to the link loading determined above by processes 84 and 86. For example, if process 86 allocated 60% of the call traffic over a subject link toward a subject destination over a first immediate successor link, 30% over a second immediate successor link, and 10% over a third immediate successor link, then various iterations of step 182 would attempt to assign 60% of the available $2^N$ route IDs to the first immediate successor link, 30% of the available $2^N$ route IDs to the second immediate successor link, and 10% of the available $2^N$ route IDs to the third immediate successor link. Of course, these precise percentages may not be achievable given the finite number of route IDs available. Nevertheless, step 182 roughly matches the proportions as best it can. For the above example, a total of eight route IDs may be allocated by assigning five route IDs to the first immediate successor link, two route IDs to the second immediate successor link, and one route ID to the third immediate successor link.

When this has been completed, program control loops back to step 170 to evaluate the next destination node until all destination nodes have been evaluated. After each of steps 180 and 182, program control loops back to step 176 to evaluate the next origination node.

When process 88 distributes logical route IDs among the physical shortest routes for all origination-destination node pairs, routing for the entire network 20 has been achieved for the subject epoch. As discussed above in connection with FIG. 4, these routing data are combined with routing data for other epochs in the planning period. The portions of the routing data for the planning period which are relevant to each switching node 30 are then sent to each switching node 31–39 prior to the actual occurrence of the planning period for which they have been prepared. Arrays 56 (see FIG. 3) are activated in correspondence with the actual occurrence of the epochs. Origination switching nodes for communications will append routing codes 48, including route IDs 52, to information packets 42 (see FIG. 2). Routing IDs 52 are selected in a manner which splits the calls among all available physically distinct, shortest path routes. Each origination and intermediate node then routes the packets 42 in response to the appended routing data so that the communications travel over physically distinct, shortest path routes as often as possible.

In summary, the present invention provides an improved method for implementing diversified routing in a communications network. The above-described embodiments of the present invention distribute communication routes between origination and destination nodes among physically distinct shortest paths. In addition, the above-described embodiments of the present invention may be implemented in a flexible and computationally efficient manner so that communication routes for an entire network may be calculated quickly. Thus, routing may be responsive to changing network conditions and a variety of user inputs.

Those skilled in the art will recognize that changes and modifications may be made in the preferred embodiments without departing from the scope of the present invention. For example, origination nodes need not append route ID codes to packets, but may precisely specify routes by identifying all intermediate nodes through which packets should pass. Moreover, those skilled in the art may arrange processes, steps, and procedures differently than described herein while achieving equivalent results. These and other changes and modifications which are obvious to those skilled in the art are intended to be included within the scope of the present invention.

What is claimed is:

1. A method of sending information through a network having a plurality of switching nodes, said switching nodes including a destination node, an origination node, and any number of intermediate nodes, and said method comprising the steps of:

identifying a plurality of physically distinct, shortest paths through said intermediate nodes between said origination and destination nodes;

appending routing data to said information, said routing data describing one of said paths;

routing said information through said network in response to said appended routing data;

assigning each of said paths a route identification code, said route identification code serving as said routing data conveying said route identification code using N bits of data, where N is an integer number; and when less than $2^N$ shortest paths exist through said intermediate nodes between said origination and destination nodes, assigning multiple ones of said route identification codes to individual ones of said paths.

2. A method as claimed in claim 1, wherein every node in said network communicates with at least one other node through communication links; and wherein said method further comprises the step of predicting call traffic in said network.

3. A method as claimed in claim 2, wherein said method further comprises the step of defining a maximum capacity for each of a plurality of links in said network.

4. A method as claimed in claim 3, wherein said identifying step comprises the steps of:

defining a first network configuration that associates each of said links with pairs of said switching nodes;

searching said first network configuration to determine said shortest paths;

allocating said predicted call traffic to said links included in said shortest paths from said first network configuration;

identifying fully-loaded links, said fully-loaded links being links in said first network configuration for which said predicted call traffic exceeds said maximum capacity, said call traffic in excess of said maximum capacity being predicted excess call traffic;

defining a second network configuration that omits said fully-loaded links;

searching said second network configuration to determine additional shortest paths; and allocating said predicted excess call traffic to said links included in said shortest paths from said second network configuration.

5. A method as claimed in claim 1, wherein every node in said network communicates with at least one other node through communication links, said method further comprises the step of defining a maximum capacity for each of a plurality of links in said network.

6. A method as claimed in claim 1, wherein:

said identifying step includes the step of associating said paths with a future epoch; and said appending and routing steps occur substantially at said future epoch.

7. A method as claimed in claim 6, further comprising the steps of:

repeating said identifying step for each of a plurality of future epochs so that an identified plurality of physically distinct shortest paths are associated with each future epoch; and repeating said appending and routing steps substantially at each of said future epochs in correspondence with said shortest paths identified therefor.

8. A method as claimed in claim 7, wherein a route-determining node of said network is physically separated from said origination node, and said method further comprises the steps of:

performing said identifying step at said route-determining node;

forming said routing data at said route-determining node in response to said identified shortest paths; and communicating said routing data to said origination node prior to said future epochs.

9. A method as claimed in claim 1, wherein said method further comprises the steps of:

predicting call traffic over said paths; and assigning said multiple ones of said route identification codes to said individual ones of said paths roughly in proportion to predicted call traffic over said paths.

10. A method as claimed in claim 1, further comprising the step of:

dividing said information into a plurality of distinct calls; and wherein said appending step comprises the step of configuring said routing data so that said calls are split among said paths.

11. A method of sending information through a network having a plurality of switching nodes, said switching nodes including a destination node, an origination node, and any number of intermediate nodes, every node in said network communicating with at least one other node through communication links, said method comprising the steps of:

predicting call traffic over each of a plurality of links in said network;

identifying a plurality of physically distinct, shortest paths through said intermediate nodes between said origination and destination nodes, said shortest paths being formed from sets of said links, and said identifying step being responsive to said predicted call traffic over said links;

assigning each of said shortest paths a route identification code;

appending one of said route identification codes to said information, said appending occurring at said origination node; and routing said information through said network in response to said appended route identification code;

conveying said route identification code using N bits of data, where N is an integer number; and when less than $2^N$ shortest paths exist through said intermediate nodes between said origination and destination nodes, assigning multiple ones of said route identification codes to individual ones of said shortest paths.

12. A method as claimed in claim 11, further comprising the step of defining a maximum capacity for each of said links in said network.

13. A method as claimed in claim 12, wherein said identifying step comprises the steps of:

defining a first network configuration that associates each of said links with pairs of said switching nodes;

searching said first network configuration to determine said shortest paths;

allocating said predicted call traffic to said links included in said shortest paths from said first network configuration;

identifying fully-loaded links, said fully-loaded links being links in said first network configuration for which said predicted call traffic exceeds said maximum capacity, said call traffic in excess of said maximum capacity being predicted excess call traffic;

defining a second network configuration that omits said fully-loaded links;

searching said second network configuration to determine additional shortest paths; and allocating said predicted excess call traffic to said links included in said shortest paths from said second network configuration.

14. A method as claimed in claim 11, further comprising the steps of:

predicting call traffic over said shortest paths; and assigning said multiple ones of said route identification codes to said individual ones of said shortest paths roughly in proportion to said predicted call traffic over said shortest paths.

15. A method as claimed in claim 11, further comprising the steps of:

repeating said identifying and assigning steps for each of a plurality of future epochs so that an identified plurality of physically distinct shortest paths are associated with each future epoch; and repeating said appending and routing steps substantially at each of said future epochs in correspondence with said shortest paths identified therefor.

16. A communication network for sending information between nodes comprising:

a route-determining node configured to identify sets of physically distinct, shortest paths between various other nodes of said network;

an origination node, in data communication with said route-determining node, said origination node being configured to append route identification codes to said information, said route identification codes describing one of said shortest paths, and to send said information and route identification codes over a first communication link chosen in response to said route identification codes, said route identification codes being conveyed using N bits of data, and when less than $2^N$ shortest paths exist assigning multiple ones of said route identification codes to individual ones of said shortest paths;

an intermediate node configured to receive said information and appended route identification codes from said first communication link and to send said information and route identification codes over a second communication link chosen in response to said route identification codes; and a destination node configured to receive said information from said second communication link.

17. A communication network as claimed in claim 16, further comprising the step of:

dividing information sent between said origination and destination nodes into a plurality of distinct calls; and configuring said origination node so that said calls are split among said shortest paths.

18. A communication network as claimed in claim 16, further comprising the steps of:

configuring said route determining node to predict call traffic over communication links in said shortest paths and to assign a route identification code to each of said shortest paths, said route identification code serving as said routing data; and configuring said route determining node to assign said route identification codes to said shortest paths roughly in proportion to said predicted call traffic over communication links included in said shortest paths.

* * * * *